United States Patent [19]

Kawai et al.

[11] Patent Number: 4,655,876
[45] Date of Patent: Apr. 7, 1987

[54] METHOD FOR FABRICATING A MASTER RECORDING DISC

[75] Inventors: Noboru Kawai; Toshiro Abe, both of Tokyo; Kei Murata, Yokohama, all of Japan

[73] Assignee: Victor Company of Japan, Ltd., Yokohama, Japan

[21] Appl. No.: 753,755

[22] Filed: Jul. 11, 1985

[30] Foreign Application Priority Data

Jul. 14, 1984 [JP]  Japan ................. 59-145272

[51] Int. Cl.$^4$ ............ B44C 1/22; C03C 15/06; C03C 25/06
[52] U.S. Cl. ................. 156/643; 156/646; 156/654; 156/659.1; 156/663; 204/192.32; 430/321; 430/323; 430/945
[58] Field of Search ............ 204/192 EC, 192 E; 430/296, 297, 299, 313, 321, 323, 363, 945; 156/643, 646, 654, 657, 659.1, 663, 904

[56] References Cited

U.S. PATENT DOCUMENTS 3,986,912 10/1976 Alcorn et al. ............ 156/643 X
4,057,831 11/1977 Jacobs et al. ............ 156/659.1 X
4,530,736 7/1985 Mutter ............ 156/659.1 X

FOREIGN PATENT DOCUMENTS 55-55449 4/1980 Japan .
55-101144 8/1980 Japan .

Primary Examiner—William A. Powell
Attorney, Agent, or Firm—Pollock, Vande Sande & Priddy

[57] ABSTRACT

In a method of fabricating a master recording disc, a photoresist layer is formed on a glass substrate to form a master blank, which is revolved and exposed to an intensity-modulated laser beam so that a series of optically excited regions is formed in track turns in the photoresist layer. The optically excited regions are removed, forming a series of pits in the photoresist layer. An etchant gas is sputtered onto the master blank until the pits in the photoresist layer extend through the boundary surface of the photoresist layer and the glass substrate to a desired depth and pits having side walls tapered in a direction away from the boundary surface are formed in the substrate. The photoresist layer which remains on the glass substrate is finally removed.

6 Claims, 11 Drawing Figures

METHOD FOR FABRICATING A MASTER RECORDING DISC

BACKGROUND OF THE INVENTION

The present invention relates generally to a method for fabricating a master recording disc to be used for mass-producing digital audio or video discs.

Master recording discs for digital audio and video disc recording are formed with pits of tapered side walls. The tapered-wall pits are advantageous since they ease the separation of molded plastic discs from the mold and are further advantageous for tracking purposes. The concept of this tapering is shown and described in Japanese Laid-open Patent Publication No. 55-55449. However, it has been difficult to form tapered-wall pits on a glass substrate of the master recording disc.

One approach that is shown and described in Japanese Laid-open Patent Publication No. 55-101144 involves the use of a master blank composed of glass substrate, a layer of $SiO_2$ deposited thereon and a photoresist layer on the $SiO_2$ layer. An intensity-modulated laser beam is directed from the master blank to the photoresist layer to produce a series of optically excited regions in track turns. The master blank is subsequently developed to form a series of pits which extend down to the boundary surface of the photoresist and $SiO_2$ layers, and then is exposed to the plasma of $CF_4$ gas in a vacuum chamber. The $SiO_2$ layer is etched by the plasma etchant so that the pits are enlarged at the top and tapered downwardly to the boundary surface of the $SiO_2$ layer and the glass substrate. Although tapered-wall pits are produced in the $SiO_2$ layer, it is difficult to maintain a consistent taper angle.

SUMMARY OF THE INVENTION

The present invention has the object of providing a method of fabricating a master recording disc for the mass-production of digital audio and video discs which ensures pits having a consistent taper angle value in an efficient manner.

The method of the invention comprises forming a photoresist layer on a glass substrate to form a master blank, revolving the master blank and directing an intensity-modulated laser beam onto the surface of the revolving photoresist layer so that a series of optically excited regions is formed in track turns in the photoresist layer. The optically excited regions are removed, forming a series of pits in the photoresist layer. The method includes the steps of sputtering the master blank with an etchant gas until the pits in the photoresist layer extend through and beyond the boundary surface of the photoresist layer and the glass substrate to a desired depth from the boundary surface. The pits have side walls tapered in a direction away from said boundary surface and are formed in the substrate. The photoresist layer remaining on the glass substrate is then removed.

BRIEF DESCRIPTION OF THE DRAWINGS

The present invention will be described in further detail with reference to the accompanying drawings, in which.

DETAILED DESCRIPTION

Figure 1A:
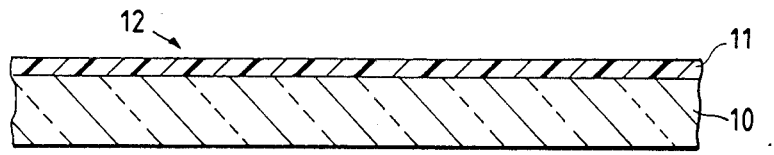
FIGS. 1A to 1D are cross-sectional views illustrating sequential steps of fabricating a master recording disc.

In FIG. 1A, a mirror-polished, soda-lime glass disc 10 having a diameter of 240 mm with a 15-mm center hole and a thickness of 10 mm is prepared. The glass disc is composed of 70 to 75 weight percent of $SiO_2$, and chemically inactive compositions such as 12 to 18 weight percent of $Na_2O$, 0 to 1 weight percent of $K_2O$, 5 to 14 weight percent of $CaO$, 0 to 4 weight percent of $MgO$ and 0.5 to 2.5 weight percent of $Al_2O_3$. A photoresist layer 11 (identified as AZ1350, a product of Shipley Chemical Company, U.S.A.) sensitive to laser beams is applied onto the glass disc 10 using a spin coat method to a thickness of about 4000 angstrom units to form a blank master disc 12. To ensure good adhesive contact between disc 10 and photoresist 11, adhesive such as hexamethyldisilazane is preferably applied onto the disc 10 before the photoresist is applied.

Figure 1B:
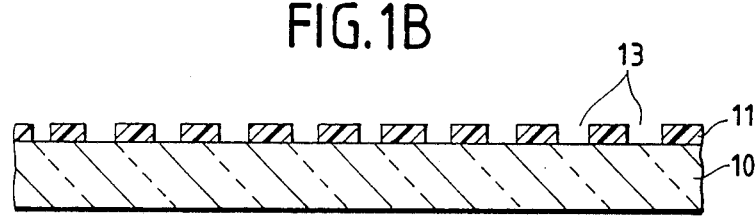
Figure 2A:
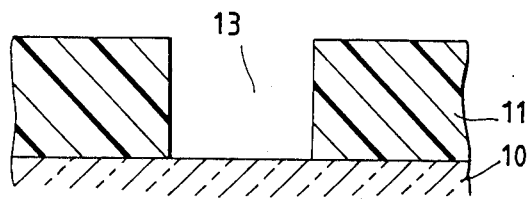
FIGS. 2A to 2F are cross-sectional views illustrating sequential changes that a given pit undergoes when the master disc is subjected to sputtered gases.
Figure 2B:
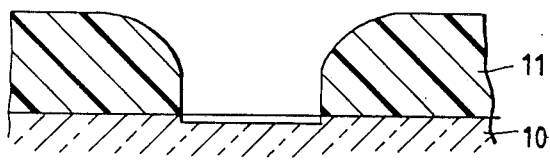
Figure 2C:
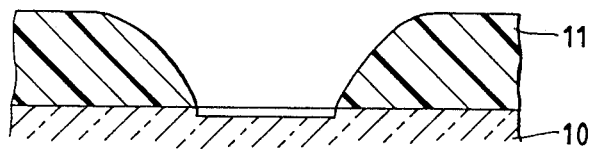
Figure 2D:
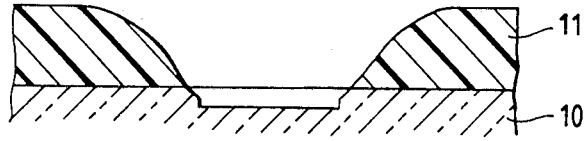
Figure 2E:
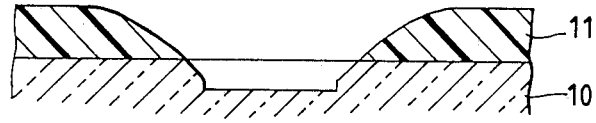

The master blank 12 is then placed on a turntable and rotated at a predetermined speed. Onto the spinning photoresist layer 11 is directed an argon laser beam having an intensity modulated with a standard digital audio signal or an FM video signal. The beam is moved at a predetermined speed in a radial direction to cause the spot of beam on the photoresist layer to follow a spiral path in a manner well known in the art, thus forming a series of optically excited regions in a spiral pattern. The photoresist 11 is then developed and the optically excited regions are etched away from the master blank to form a series of microscopic pits 13 along a spiral track as shown in FIG. 1B. The intensity of the laser is such that it produces pits having sidewalls perpendicular to the disc surface as illustrated in FIG. 2A.

The master disc is then placed in a gas etching apparatus for sputtering the surface of the master disc 12 with an etchant gas in a manner in which the physical properties of the etchant and photoresist layer 11 are considered predominant factors in the formation of pits of desired configuration. This apparatus has a chamber in which is mounted a pair of upper (positive) and lower (cathode) disc electrodes 250 mm in diameter spaced a distance of 65 mm apart. The master disc is placed on the cathode. The chamber is initially evacuated to a vacuum of $5 \times 10^{-3}$ Torr and then $CF_4$ (tetrafluoromethane) gas is introduced to the apparatus at a pressure of $2 \times 10^{-2}$ Torr. 200-watt high frequency energy at 13.56 MHz is applied to the electrodes for a period of 12 minutes and 30 seconds. During the gas etching process, the master disc is bombarded by downward streams of positively ionized etchant gas. Because of the uniformly directed cathode bombardment, the photoresist 11 is etched at a higher rate on the edges of pits 13 than on its upper surface and the bottom of pits 13, i.e., the glass disc 10, is etched uniformly. As a function of time, edges of the pits in the photoresist are progressively eroded as seen in FIGS. 2B to 2E such that they assume an inverted trapezoidal shape with the height of the trapezoid becoming small with time. Meanwhile, the pits in the glass become increasingly deeper and are tapered downward with their side walls blending continuously with the side walls of pits in the photoresist.

Figure 1C:
Figure 1D:
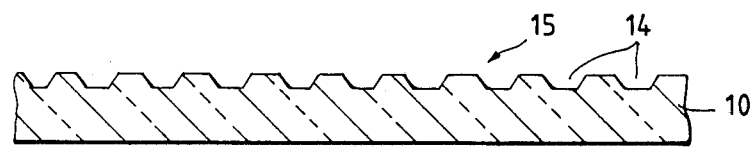
Figure 2F:
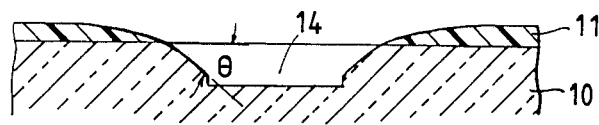

At the final stage of sputtering, pits 14 with a depth of about 0.1 micrometer are created in glass disc 10 as seen in FIG. 2F and the side walls of pits 14 forms an angle of 45 degrees with the horizontal. A series of microscopic pits of 0.1-micrometer depth is therefore formed in the glass master disc in a spiral pattern (FIG. 1C). The photoresist 11 which remains on the glass disc is removed under the environment of oxygen plasma to produce a complete master disc 15 (FIG. 1D).

Master disc 15 is then applied with a coat of silver which is formed by conventional electroless plating (silvering) to make its surface electrically conductive. A coat of nickel is then applied onto the silver coat using electroforming technique. This process is repeated to produce a number of nickel molds for stamping audio or video discs on a mass-production basis.

Figure 3:
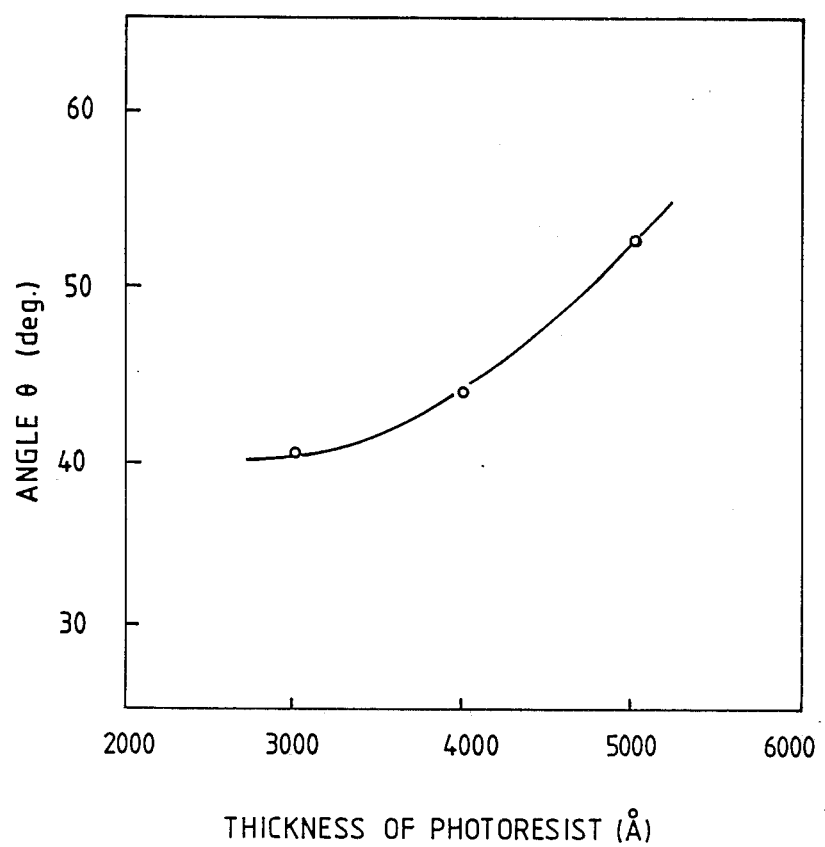
FIG. 3 is a graphic view illustrating the relationship between the angle of the side walls of pits and the thickness of a photoresist deposited on a glass substrate.

FIG. 3 is a graphic representation of the results of experiments involving the use of master discs on which photoresist layers of different thicknesses are deposited to determine the relationship between the taper angle $\theta$ and the photoresist thickness. The experiments show that the thickness of the photoresist plays a key role in forming the tapered-wall pits in a glass disc. In particular, the optimum taper angle of 45 degrees was observed when the thickness of the photoresist layer was 4000 angstrom units. This is considered to arise from the fact that the movement of the etchant gas is oriented only in one direction, rather than in all directions as exhibited by gases in the state of plasma. Since the thickness of the photoresist layer is a predominant factor, the desired taper angle can be easily obtained by controlling the thickness of the photoresist layer, while maintaining the sputtering conditions constant for a given set of glass material and etchant gas. This ensures a stable and efficient manner of production. A further advantage of the invention is that it requires only the photoresist material to be deposited on the glass substrate, which simplifies the manufacturing process. It is preferable that the inactive compositions contained in the glass disc 10 be more than 10 percent by weight. The inactive compositions of this amount reduce the tendency of the etchant material to provide chemical etching which would otherwise cause sideway etching in photoresist layer 11 with the result that the pits in glass disc 10 would assume an undesired shape. In an alternative method, argon gas could equally be as well employed instead of $CF_4$ gas for sputtering the disc.

What is claimed is:

1. A method for fabricating a master recording disc comprising:
   (a) forming a photoresist layer on a glass substrate to form a master blank;
   (b) revolving said master blank;
   (c) directing a laser beam onto the surface of the revolving photoresist layer, said laser beam being modulated in intensity with a signal to be reproduced so that a series of optically excited regions is formed in track turns in said photoresist layer;
   (d) removing said optically excited regions to form a series of pits in said photoresist layer;
   (e) sputtering said master blank with an etchant gas until the pits in the photoresist layer extend through and beyond the boundary surface of the photoresist layer and the glass substrate to a desired depth from said boundary surface and pits having side walls tapered in a direction away from said boundary surface are formed in said substrate; and
   (f) removing said photoresist layer which remains on said glass substrate.

2. A method as claimed in claim 1, wherein the pits formed in said photoresist layer have side walls perpendicular to the boundary surface of said photoresist layer and said substrate.

3. A method as claimed in claim 2, wherein said pits extend through said photoresist layer to the boundary surface of said photoresist layer and said substrate.

4. A method as claimed in claim 1, wherein said glass substrate is composed of 90 or less percent by weight of $SiO_2$ and 10 or more percent by weight of a composition which is inactive to said etchant.

5. A method as claimed in claim 4, wherein said etchant is $CF_4$.

6. A method as claimed in claim 5, wherein said photoresist layer has a thickness of about 4000 angstrom units.

* * * * *